Patented Oct. 13, 1942

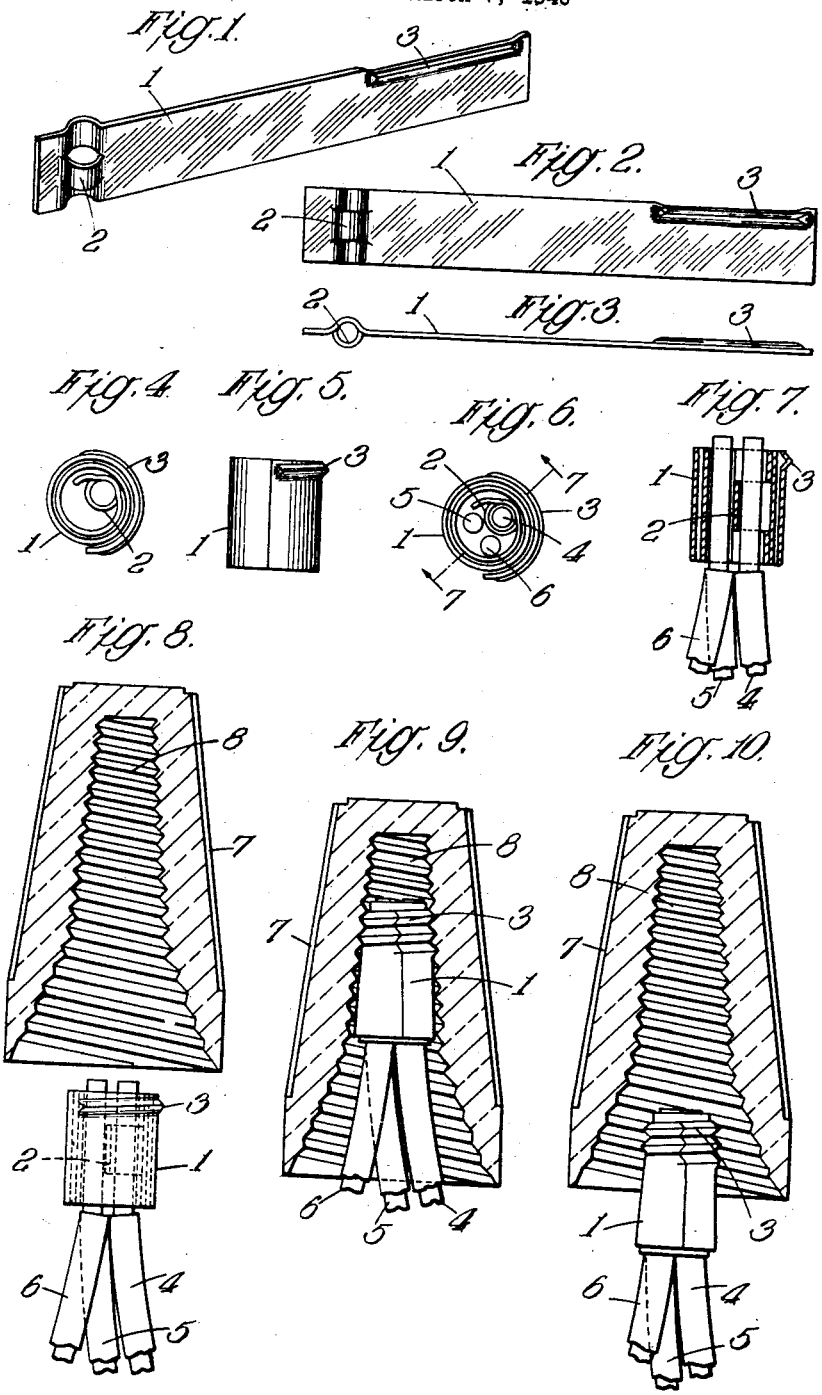

2,299,037

UNITED STATES PATENT OFFICE 2,299,037

CONNECTOR FOR ELECTRICAL CONDUCTORS OR THE LIKE

Johann Heinrich Saueressig, Enschede, Netherlands, assignor to V. G. Manufacturing Company Limited, London, England, a British company Application March 7, 1940, Serial No. 322,727
In Great Britain March 20, 1939

10 Claims. (Cl. 174—87)

This invention relates to connectors for electrical conductors or the like, the chief object being to enable the bared or exposed ends of two or more electrical conductors such as insulated plain wires, stranded wires or the like of various kinds, and of the same or different sizes, to be readily and securely connected together in an improved manner which ensures proper electrical connection of the wires, and at the same time enables the connected ends to be adequately protected or covered for insulation purposes, whilst also permitting of ready inspection or separation and/or replacement of the connected wires when required.

In the improved method of connecting or contacting the ends of electrical conductors such as plain or stranded wires according to the invention, a band or strip or the like, preferably made of electrical conducting material coiled or wound around the ends of the wires and with at least one of them separated from the other wire end or ends by part of the band or strip, is tightened around the said ends by applying rotary movement to cause the band or strip to grip the several ends together so that they cannot be easily withdrawn from the tightly coiled band or strip surrounding them and are thus securely held for all practical purposes. Preferably the rotary movement is applied by means of an internally screw threaded cap preferably made of insulating material, which is screwed onto the band or strip coiled or wound around the ends of the wires, the internal thread of the cap threading or screwing itself onto the coiled or wound band or strip and winding the latter so tightly as to bind the wire ends securely together and thus hold them against withdrawal or displacement from the cap which cannot be readily removed from the wire ends which are gripped within the tightly coiled securing medium, except by unscrewing it, when the wire ends and the securing band or strip become separated from the cap as a whole which can be re-screwed into the cap if desired after making any replacement or alteration that may eventually be necessary. The invention may be carried out in different ways, for instance, the band or strip may be preformed into a coil which may be cylindrical in shape, and a loop or eyelet or other part of the band or strip divides the interior of the coil into two sections, each of which receives at least one of the wire ends to lock it with regard to the band and thus form a point of anchorage about which the coiled securing medium is wound by the tightening action above described to grip and secure the wire ends. Alternatively, the band or strip may be wrapped or wound around the wire ends, being first looped or similarly placed around at least one of the wire ends to form the anchorage for subsequent tightening of the band, the band or strip then being coiled or wrapped around the ends of the wire either individually or collectively. The band or strip can be wound so as to be more or less cylindrical about the wire ends, or it may be wound conically. The band or strip, whether preformed into a coil or otherwise, may be formed with a raised or rib-like portion (or portions) which is externally disposed and forms a lead for engaging or following the screw thread in the cap, or it may be formed to provide an external screw thread for facilitating the screwing on of the cap. In the case of a wire coiled or wound around the wire ends, the wire follows the screw thread in the cap and thus facilitates the screwing on of the cap.

In order that the said invention may be clearly understood and readily carried into effect, the same will now be more fully described with reference to the accompanying drawing, in which—

Figures 1, 2 and 3 are respectively a perspective view, a side view and a plan of one form of the metal strip which is used to form the coiled band into which the bared ends of the insulated wires can be inserted.

Figures 4 and 5 are respectively a plan view and a side view of the said strip wound to constitute a preformed coiled band.

Figures 6 and 7 are respectively a plan view and a vertical sectional view showing the bared ends of insulated wires placed within the coiled band.

Figure 8 shows the wire ends assembled in the coiled band ready for the insulating cap to be applied.

Figure 9 shows the insulating cap screwed on to the coiled band and the wires tightly held within the band as a result of being screwed into the insulating cap.

Figure 10 illustrates the insulating cap unscrewed from the securing band which, as shown, remains tightly held around the bared ends of the wires.

In the said drawing which illustrates the various parts of the improved connector on an enlarged scale and discloses the method herein, the reference numeral I represents the aforesaid strip which is made of comparatively thin flexible or resilient metal which is yielding and a good electrical conductor and has near one end on one side an eyelet or loop 2 formed by punching part of the metal outwardly, whilst at the other end a portion is pressed outwardly on the other side of the strip near the upper edge to form a beading 3, as shown more particularly in Figures 1, 2 and 3. The strip 1 having the eyelet 2 and in order to produce a preformed coiled strip or band, the beading 3 is then wound upon itself to form a coiled band or ferrule with the eyelet 2 located in the middle of the coil, the beading 3 being located externally around the upper part of the coiled band which may be cylindrical as shown or have any other obvious form. The coiled band so formed is adapted to receive within it the bared ends of insulated wires, of which in the example shown there are three, indicated at 4, 5 and 6. One of the bared ends of these wires as shown at 4 in Figure 6 is inserted in the eyelet or loop 2 within the coiled band, and the bared ends of the other two wires 5 and 6 are inserted in the internal space of the coil so as to be separated from the wire end 4 held within the eyelet or loop 2, this arrangement being clearly shown in Figure 6. Having assembled the bared ends of the insulated wires 4, 5 and 6 within the coiled band in the manner described, the insulating cap for securing or connecting these ends can be applied. The cap represented by the reference numeral 8 may be made of any suitable insulating material, preferably synthetic resin or porcelain, and it is formed with an internal aperture or bore which may be conical so as to provide an enlarged mouth at the lower end. This internal opening is screw threaded throughout its length as shown, or it may be threaded at the upper part only, leaving a plain but flared mouth at the lower end. The cap is placed over the coiled band embracing the bared ends of the wires, and by rotating the cap relatively to the band and the wires, the external beaded portion 3 on the coiled band can engage the internal screw thread in the cap so as to enable a screw threaded engagement between the cap and the coiled band to be effected while the wires are held or anchored stationary. By reason of the wire 4 being held within the eyelet 2 of the coiled band, the latter can be tightened about the point of anchorage by the cap when rotated and screwed on to the coiled band so as to cause the latter to grip and securely bind the inserted or embraced bared ends of the wires to retain them against withdrawal or displacement. Owing to the conicity of the internal screw thread of the cap the convolutions of the coiled band are gradually decreased in diameter but are extended longitudinally, thus causing the depth of the band to increase as the cap is screwed further on to the band. In this way the bared ends of the wires are gripped with increasing pressure until they are immovably held against withdrawal from the coiled band or cap. A very strong mechanical connection or securing of the several wires is therefore effected at the same time affording the requisite electrical connection or contact of the said wires. It will be appreciated that the insulated portions of the wires adjacent the bared ends enter the enlarged lower end of the insulating cap so that complete and effective insulation of the connected wires is afforded. The wire ends firmly secured within the now tightly coiled band form a whole which as such can be unscrewed from the cap to enable the cap to be removed to permit of inspection of the connected wire ends which can, if desired, be readily removed from the band by uncoiling the latter for inspection or replacement and re-inserted in the cap by using a new coiled band or, if necessary, using the one removed by coiling it around the wires after one of them has been inserted in the eyelet to enable the band surrounding the wire ends to be screwed into the internal thread in the cap to produce the screw threaded engagement for tightly coiling the band around the wires. In a modified form the band may be preformed along its length and wholly over one side to provide on the exterior of the coiled band a raised surface which serves as a screw thread. Any convenient number of wires of different sizes and either plain or stranded, or both, can be connected together by the means according to the invention.

When a flat strip or band is wrapped around the wire ends, it produces a coil, either cylindrical or conical, around the ends of the wires to be connected. For example, a band or strip such as shown in Figures 1, 2 and 3 can be used, and the end of one of the wires is inserted in the loop or eyelet 2 on the strip to form the point of anchorage and the band or strip is then wound around the other wire ends when appropriately placed adjacent the wire end inserted in the loop or eyelet 2, which forms the point of anchorage, so as to produce an arrangement wherein the remaining wire ends are collectively held within the center of the coil similar to that shown in Figure 6, or alternatively, an arrangement in which the individual wire ends are between convolutions or parts of the coil. Of course, the eyelet need not be formed as shown by punching, but other constructions may be resorted to, if desired, so long as the feature is included of having a relatively small loop surrounding one or more of the wire ends to be connected, disposed within the outline of the main coiled portion of the connector to form a point of anchorage for drawing the main portion of the connector tight about the one or more remaining wire ends. The strip or band having been coiled around the wire ends is ready to have the insulating cap applied to the screw and wind the band or strip tightly around the wire ends about the point of anchorage until the grip is such that all the wire ends are gripped and held against displacement as hereinbefore described with reference to Figure 9. The wires bound and connected in this way can also be removed from the cap as a whole as shown in Figure 10 for inspection and replacement of the wires as hereinbefore described.

What I claim and desire to secure by Letters Patent of the United States is:

1. In means for connecting or effectively contacting the ends of electrical conductors such as plain or stranded wires, of the type comprising a coiled initially elongated member of conducting material intended to surround the wire ends to be connected, the combination of a looped portion located within the latter and being of smaller diameter than the same, said looped portion forming a point of anchorage for one or more of the wire ends to be connected and allowing the coiled member to be tightened about the same and the remaining one or more wire ends by partial rotation about said looped portion, the coiled member being formed of a band or strip having at least one projecting rib upon the exterior of the same extending along a limited length thereof to form a thread portion adapted to engage in the interior threads of an internally threaded cap or the like.

2. In means for connecting or effectively contacting the ends of electrical conductors such as plain or stranded wires, of the type comprising a coiled initially elongated member of conducting material intended to surround the wire ends to be connected, the combination of an interior apertured portion within the coiled member forming a looped separating portion dividing the interior of said coiled member into two sections of which one section is conditioned to receive at least one end of the wires to be connected, and serve as a point of anchorage, while the other section of the coiled member is conditioned to receive the remaining one or more wire ends and allowing the coiled member to be tightened about the same and the remaining one or more wire ends by partial rotation about said looped portion, and the interior aperture portion being integral with the coiled member and said coiled member carrying means upon the exterior thereof for engaging the threads within an internally threaded cap.

3. In means for connecting or effectively contacting the ends of electrical conductors such as plain or stranded wires, of the type comprising a coiled initially elongated member of conducting material intended to surround the wire ends to be connected, the combination of an interior apertured portion within the coiled member forming a looped separating portion dividing the interior of said coiled member into two sections of which one section is conditioned to receive at least one end of the wires to be connected, and serve as a point of anchorage, while the other section of the coiled member is conditioned to receive the remaining one or more wire ends and allowing the coiled member to be tightened about the same and the remaining one or more wire ends by partial rotation about said looped portion, and an internally threaded insulating cap adapted to be applied to the coiled member and having the coiled member formed exteriorly with means for engaging the threads within said insulating cap upon rotation of the latter.

4. Method of connecting together the ends of electrical conductors, which consists in dividing the bared ends of the conductors to be connected into two groups extending substantially parallelly to each other, one of said groups consisting of at least one of said bared ends, anchoring an elongated band or strip of ductile metal by one of its ends to one of said groups, coiling the remaining free portion of said band or strip around the bared ends of both groups of conductors, so that the coils thereby formed lie progressively in a direction substantially at right angles to the length of the bared ends to produce a tubular shaped element with the bared ends of the conductors lying longitudinally of and within the bore thereof, and thereafter applying a winding force to the tubular shaped element in a direction resulting in a reduction in the diameter of the coils thereof, thus causing the said element to hold and grip all the bared ends tightly.

5. Method of connecting together electrical conductors, which consists in providing an eyelet approximately at one end of an elongated band or strip of ductile metal, said eyelet being formed by means of a loop extending laterally of at least one of the side faces of the said band or strip, coiling the band or strip in such a manner as to form a tubular shaped element having overlapping coils and having said loop lying in the bore thereof and so dividing the bore into two openings one of which is constituted by said eyelet, baring the ends of the conductors to be connected, inserting at least one of the bared ends into one of the two openings in the bore of the tubular shaped element and the remainder in the other of said openings so that all the bared ends lie longitudinally of the bore, and thereafter applying a winding force to the tubular shaped element in a direction resulting in a reduction in the diameter of the coils thereof, thus causing said element to hold and grip all the bared ends tightly.

6. A connector for the bared ends of a plurality of electrical conductors, comprising an elongated band or strip of electrical conducting material having substantially at one end thereof an eyelet formed by a loop projecting upon the surface from at least one of the two side faces of said band or strip, the material of the band or strip being of such flexible nature that it is capable of being coiled upon itself to form a tubular shaped element the coils of which overlap each other and in which the loop forming the eyelet lies in the bore of said element and divides the bore into two substantially parallel passage-ways one of which is constituted by the said eyelet, one of said passage-ways being adapted to receive at least one of the bared ends and the other passage-way the remainder of the bared ends by entry of all the bared ends through an end of the bore, and clamping means for applying a compressive winding force to the band or strip after it has been coiled to produce the tubular shaped element so as to reduce the diameter of said element.

7. A connector according to claim 6, wherein there is provided at the end of the band or strip opposite the end provided with the eyelet, a beading which extends longitudinally of the band or strip, said beading being adapted to project from the curved outer wall of the tubular shaped member formed by the coiling of the band or strip.

8. A connector according to claim 6, wherein the clamping means for applying the compressive winding force consists of a cap having an inwardly tapered screw-threaded recess in which the band or strip is adapted to be engaged after it has been coiled to form the tubular shaped element.

9. A connector for the bared ends of a plurality of electrical conductors, comprising a tubular shaped element of electrical conducting material, said element having convolutions or coils embracing each other and having in the bore thereof an eyelet formed by a loop which divides the bore into two substantially parallel passage-ways one of which is constituted by the said eyelet, one of said passage-ways being adapted to receive at least one of the bared ends of the conductors and the other passage-way being adapted to receive the remainder of the bared ends, entry of all the bared ends into the passage-ways being gained through at least one end of the bore, and partly rotatable clamping means for applying a winding force to the tubular shaped element for the purpose of reducing the diameter thereof and so causing the said element tightly to grip the plurality of bared ends after they have been entered in the passage-ways in the bore of said element.

10. A connector for the bared ends of electrical conductors, comprising a tubular shaped element of electrical conducting material having convolutions or coils embracing each other and having on the curved outer surface thereof a beading projecting outwardly of the said surface, said element also having an eyelet formed by a loop projecting into and dividing the bore of the element into two passage-ways one of which is constituted by said eyelet, one of said passage-ways being adapted to receive at least one of the bared ends of the conductors and the other passage-way being adapted to receive the remainder of the bared ends, entry of all the bared ends into the passage-ways being gained through at least one end of the bore, and a cap having an inwardly tapered recess adapted to receive the tubular shaped element, said recess containing screw-threads adapted to co-operate with the beading and being so disposed that on rotation of the cap in one direction the cap is caused to move towards the conductors, thereby resulting in a reduction in the diameter of the tubular shaped element whereby the said element is brought into firm gripping engagement with the bared ends when these are entered in the passage-ways in the bore thereof and whereby the cap itself is engaged firmly around said element and compels the same to maintain its grip.

JOHANN HEINRICH SAUERESSIG.